No. 748,097. PATENTED DEC. 29, 1903.
J. C. POTTER & J. JOHNSTON.
DOUBLE TURRET LATHE.
APPLICATION FILED MAR. 21, 1902.
NO MODEL. 8 SHEETS—SHEET 1.

No. 748,097. PATENTED DEC. 29, 1903.
J. C. POTTER & J. JOHNSTON.
DOUBLE TURRET LATHE.
APPLICATION FILED MAR. 21, 1902.
NO MODEL. 8 SHEETS—SHEET 3.

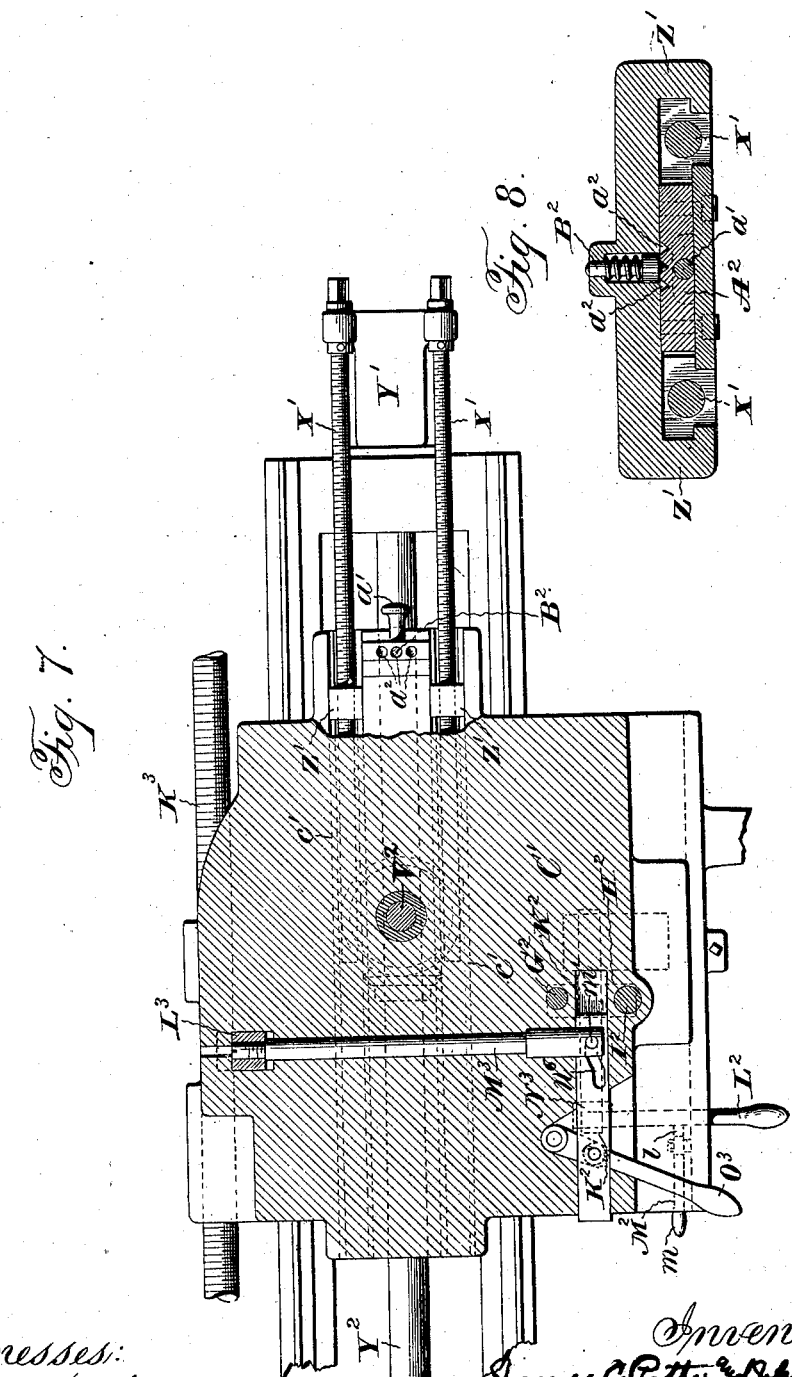

No. 748,097. PATENTED DEC. 29, 1903.
J. C. POTTER & J. JOHNSTON.
DOUBLE TURRET LATHE.
APPLICATION FILED MAR. 21, 1902.
NO MODEL. 8 SHEETS—SHEET 7.
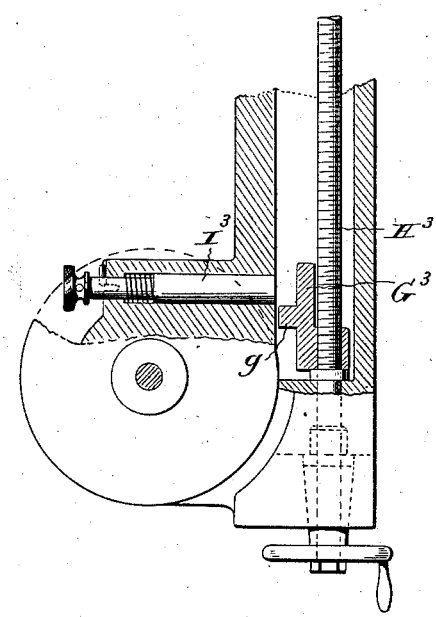
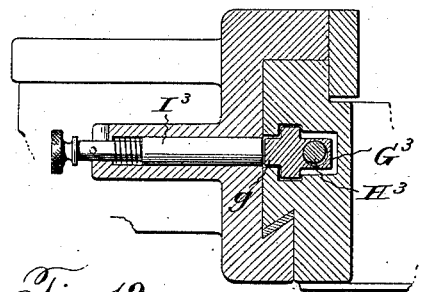
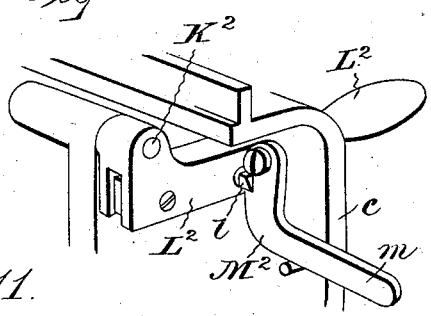
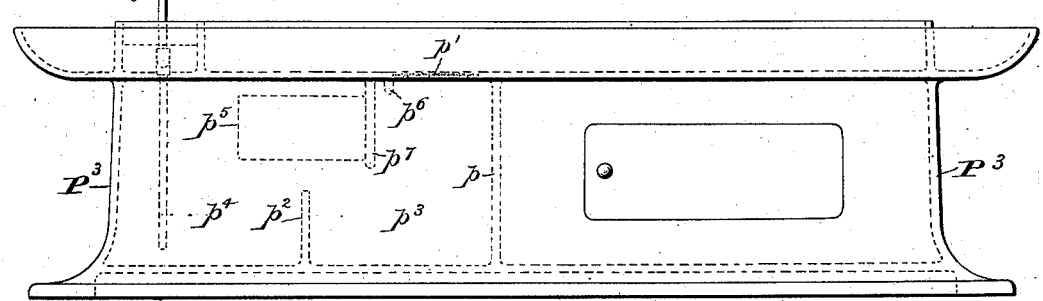

No. 748,097. Patented December 29, 1903.

UNITED STATES PATENT OFFICE.

JAMES C. POTTER AND JOHN JOHNSTON, OF PAWTUCKET, RHODE ISLAND, ASSIGNORS TO POTTER AND JOHNSTON MACHINE COMPANY, OF PAWTUCKET, RHODE ISLAND.

DOUBLE-TURRET LATHE.

SPECIFICATION forming part of Letters Patent No. 748,097, dated December 29, 1903.

Application filed March 21, 1902. Serial No. 99,297. (No model.)

*To all whom it may concern:*

Be it known that we, JAMES C. POTTER and JOHN JOHNSTON, of Pawtucket, in the county of Providence and State of Rhode Island, have invented certain new and useful Improvements in Double-Turret Lathes; and we do hereby declare that the following is a full, clear, and exact description thereof, reference being had to the accompanying drawings, in which—

Figure 1:
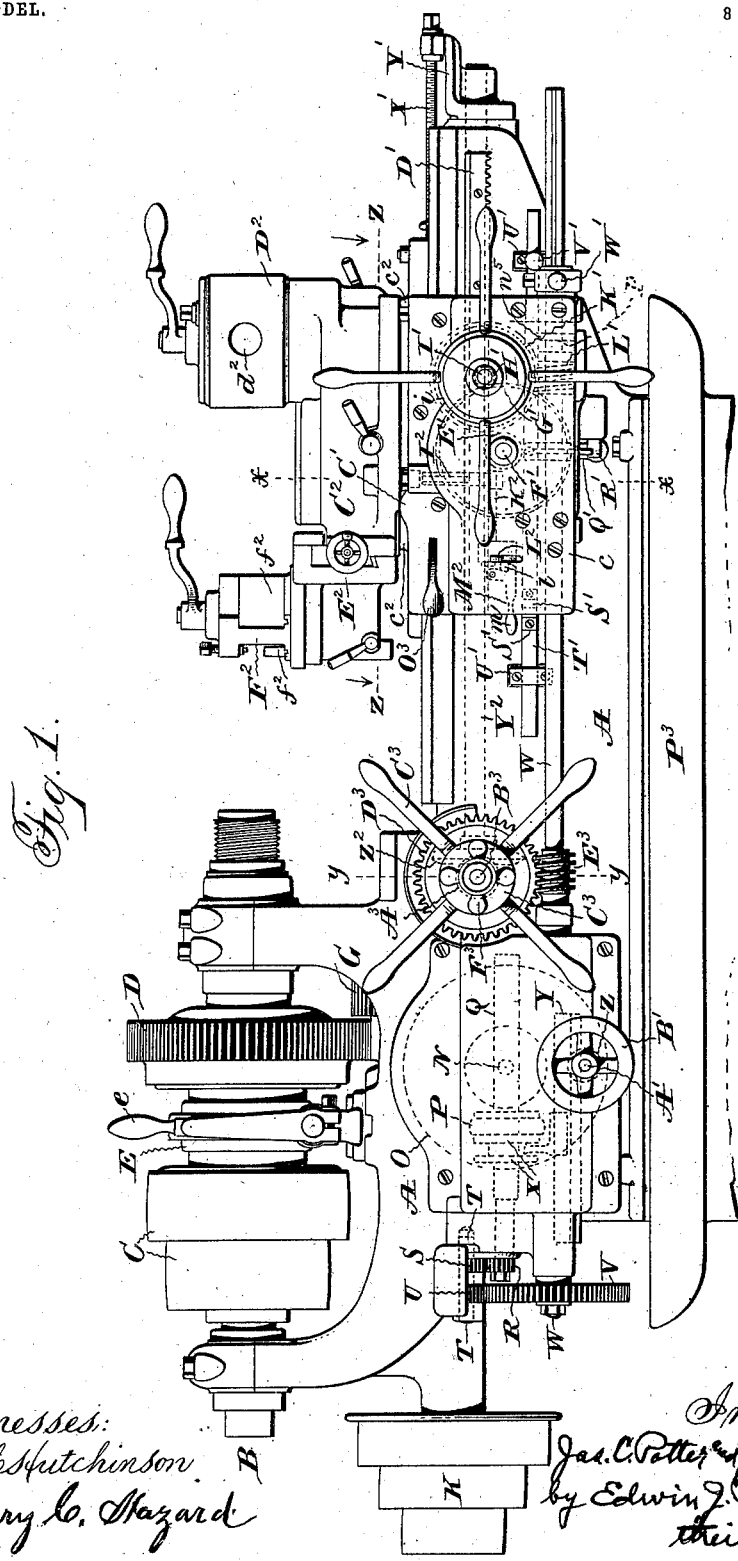
Figure 2:
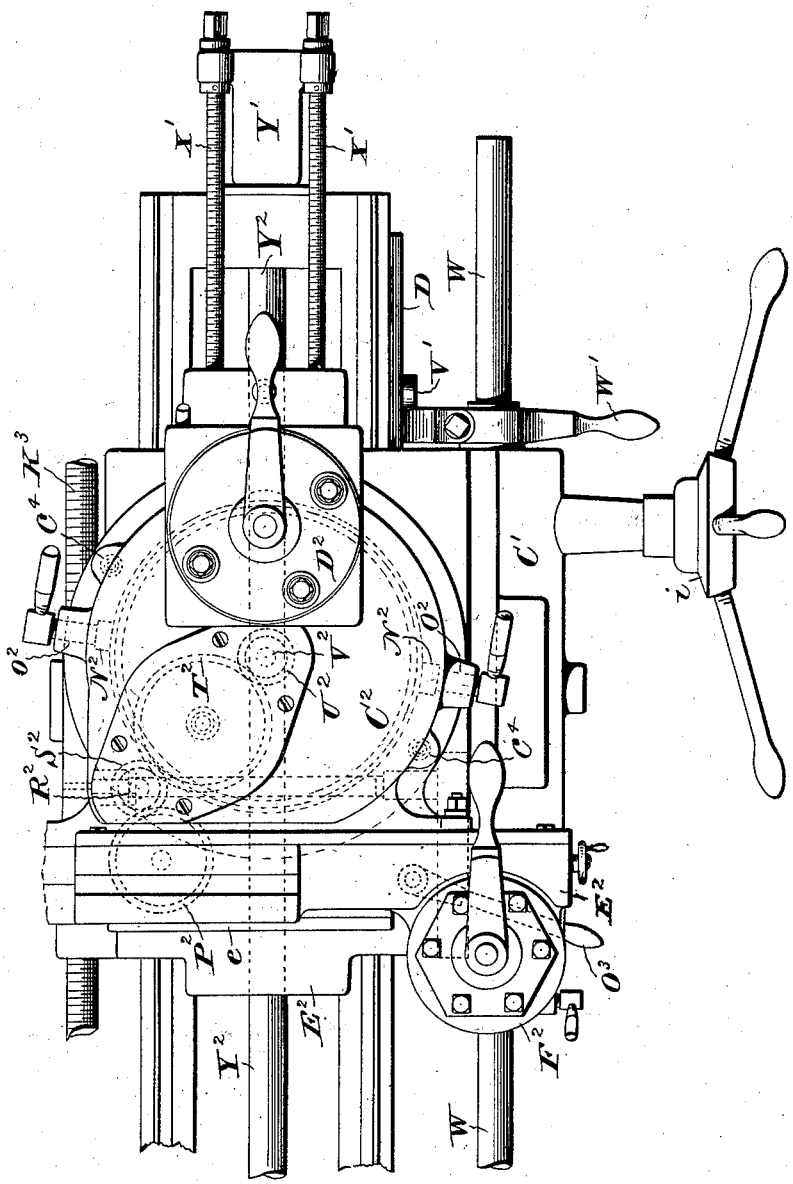
Figure 3:
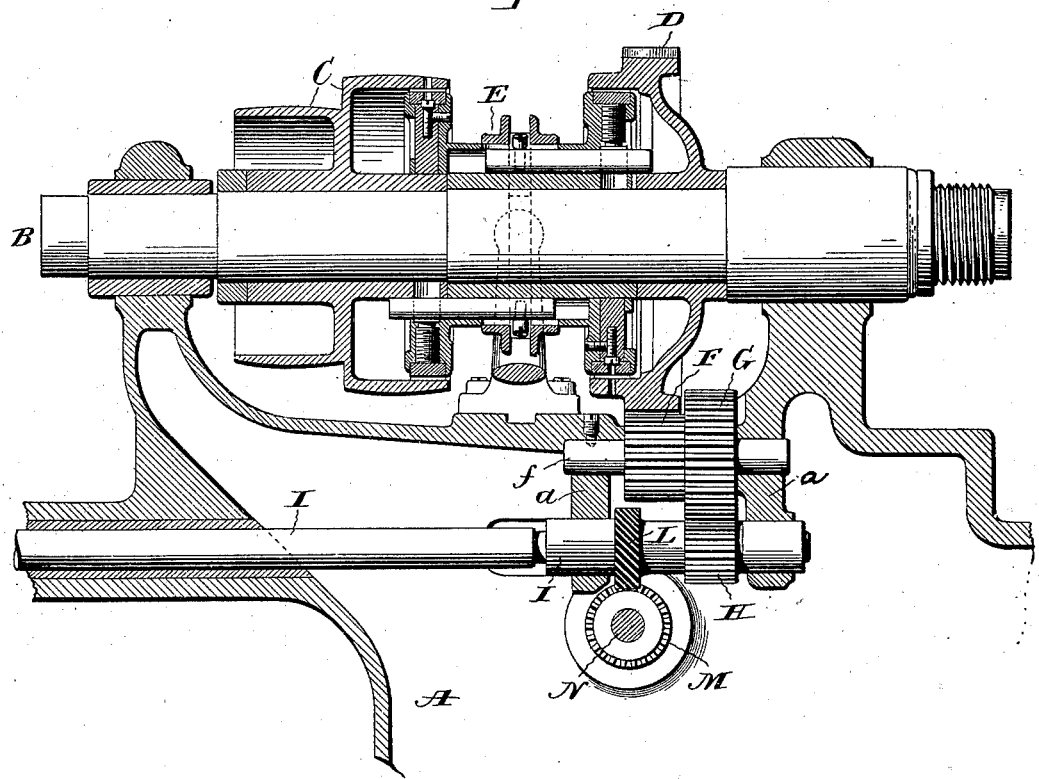
Figure 4:
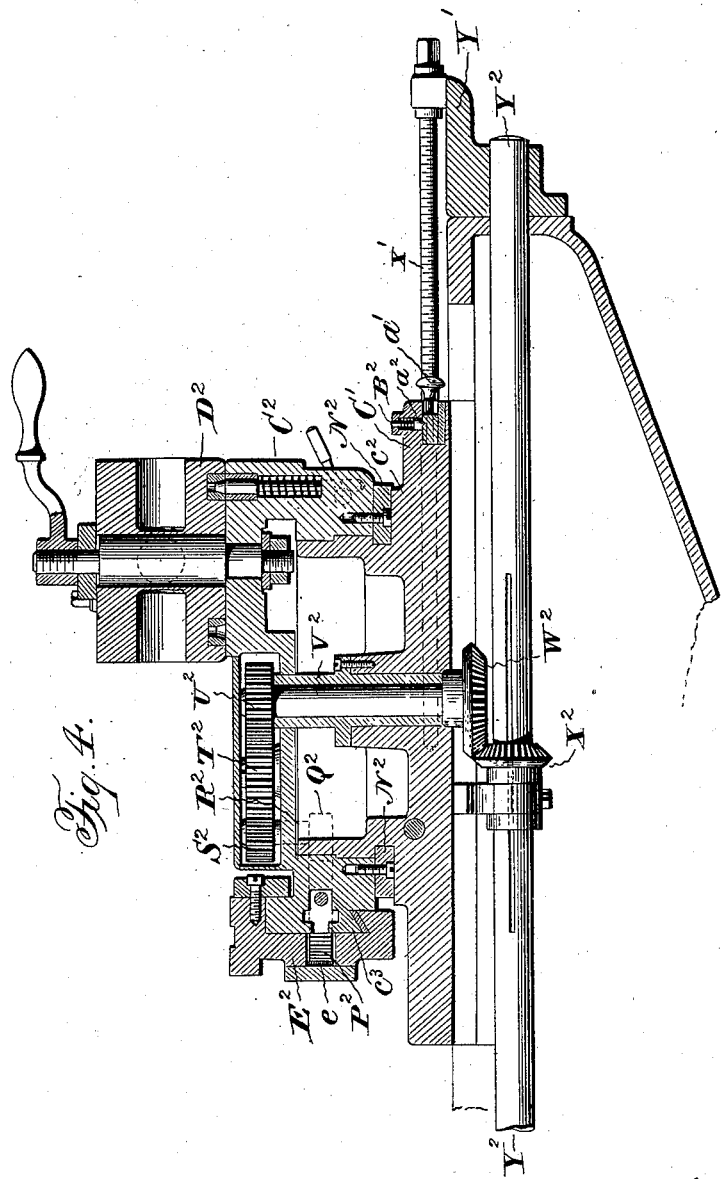
Figure 5:
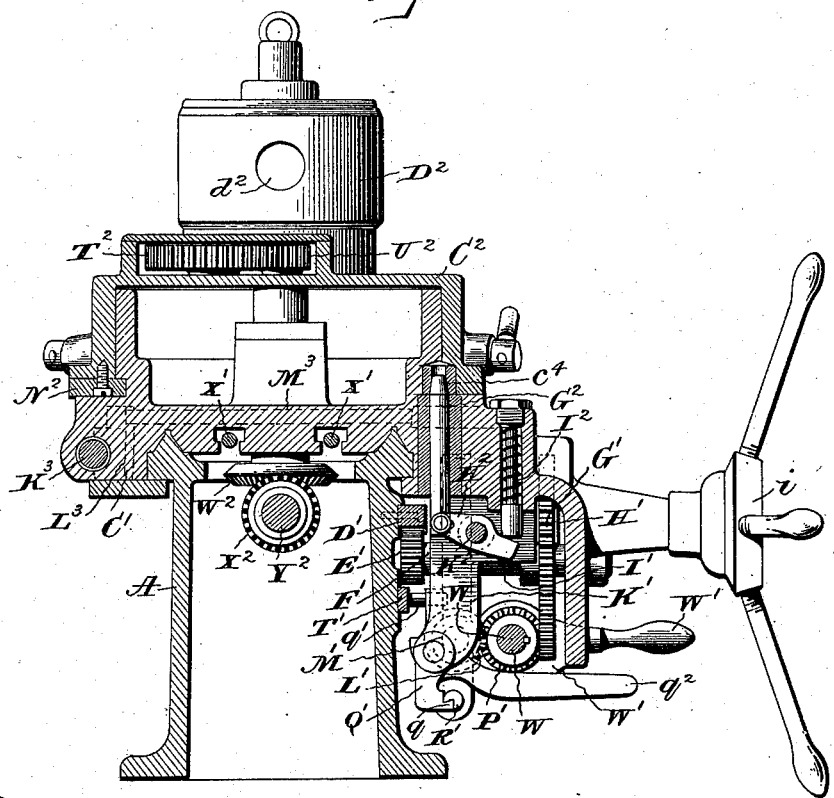
Figure 6:
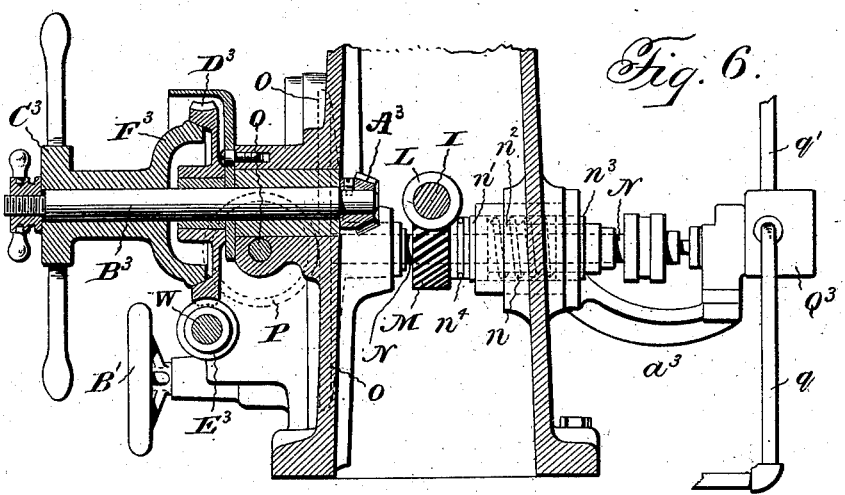
Figure 14:
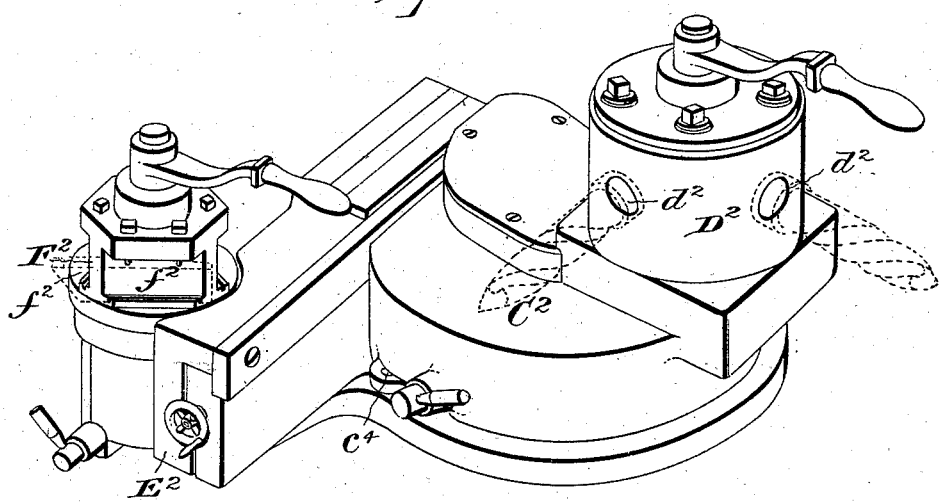
Figure 15:
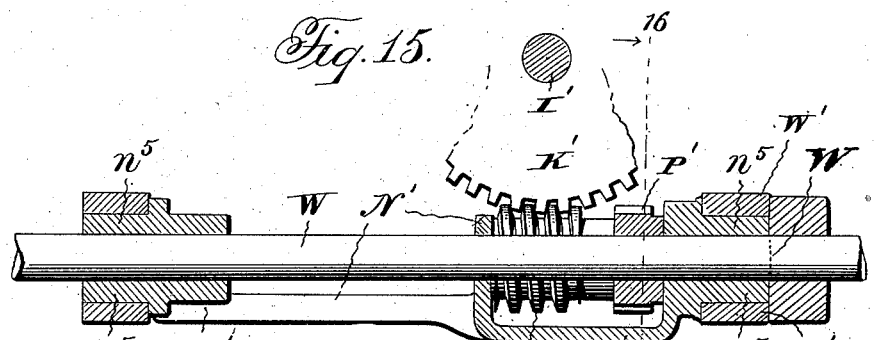
Figure 16:
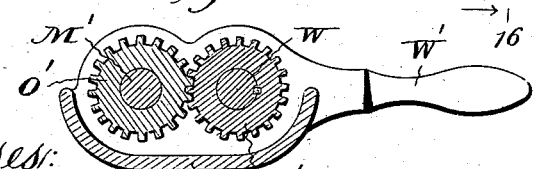

Figure 1 is a side elevation of a lathe embodying our invention. Fig. 2 is a top plan view of the turret end of said lathe. Fig. 3 is a vertical longitudinal section through the head-stock spindle. Fig. 4 is a similar view through the tool-carriage. Fig. 5 is a transverse section on the line $x\,x$ of Fig. 1. Fig. 6 is a like view on the line $y\,y$ of Fig. 1. Fig. 7 is a horizontal section on the line $z\,z$ of Fig. 1. Fig. 8 is a detail view in cross-section showing the carriage-stopping mechanism. Fig. 9 is a detail view, partly in plan and partly in section, of the cross-slide stop mechanism; Fig. 10, a vertical cross-section of the same; Fig. 11, a side elevation of the bed or frame; Fig. 12, a detail view in perspective of the turret-locking bolt-actuating lever and its latch; Fig. 13, a detail view in perspective of the block for disengaging the worm and worm-wheel to stop the feed of the carriage; Fig. 14, a detail view in perspective of the rotatable turret-supporting table; Fig. 15, a detail view, in longitudinal section, of part of the mechanism for disengaging the carriage-feeding mechanism, and Fig. 16 is a detail view in section on the line 16 16 of Fig. 15.

Letters of like name and kind refer to like parts in each of the figures.

The object of our invention is to improve the construction of metal-working lathes, so as to add to their working capacity and efficiency; and to this end our invention consists in the lathe having the features of construction substantially as hereinafter specified.

The lathe to which our invention specifically pertains is of the turret type; but as there are features of construction which are adaptable to other machines it is to be understood that the scope of the invention in respect to such devices or mechanisms as are capable of use elsewhere than in turret-lathes extends to and embraces said devices or mechanisms when used in other relations.

In the carrying of our invention into practice there is employed a bed or frame A, having two upwardly-extending arms or brackets for supporting the head-stock spindle B, the spindle being provided with a suitable chuck, not required to be described. Loose on the spindle B is a two-step cone-pulley C for belting to the counter-shaft, and a gear-wheel D, driven in the manner to be presently described, either of which may be clutched to the spindle to drive the same. A friction-clutch E, having an operating lever or handle *e* for alternately clutching one or the other to the spindle, is illustrated; but of course any other construction of clutch may be employed, if desired. Meshing with the gear-wheel D is a pinion F, loose on a shaft *f*, fixed in brackets *a* and *a* on the bed A, and connected with said pinion, so as to rotate therewith, is a larger pinion G, that meshes with a pinion H, keyed to a shaft I, that is journaled in bearings in the brackets *a* and *a* and is projected beyond the bed A, where it has keyed to it a three-step cone-pulley K, also for belting to the counter-shaft. By the employment of the second cone-pulley K to drive the spindle-gear D instead of gearing from the cone-pulley C to the gear D we are enabled to obtain spindle speeds intermediate those that are possible where the single pulley is used to directly drive the spindle and to drive it through reducing-gears.

Keyed to the shaft I is a spiral gear L, that meshes with a like gear M, keyed to a transversely-mounted shaft N, to which is secured a friction-disk O. Engaging the latter is a friction-wheel P, splined to a longitudinally-extending shaft Q, lying along the front of the lathe, to which is keyed a pinion R, meshing with a pinion S on a shaft T, rotatively connected to which pinion S is a pinion U, meshing with a gear V on the tool-carriage feeding-shaft W. The reducing-gearing described between the shafts Q and W is employed because the friction-wheel P is driven at a high speed. For varying the speed of the friction-wheel P, and consequently the speed of the feed-shaft, the friction-wheel, as is usual, is shiftable toward and from the center of the friction-disk, said wheel P being for this purpose journaled in a frame X, that is connected to a rack Y, with which meshes a pinion Z on a shaft A', having a hand-wheel B', by which the shaft may be revolved and through the pinion and rack the position of the friction-wheel changed. To reverse the revolution of the friction-wheel P, and thus the revolution of the feed-shaft, the friction-wheel is shifted from one side of the axis of the disk O to the other side, and of course its speed can be varied when it is on one side of the disk-axis as readily as on the other.

The disk O is pressed against the friction-wheel despite any irregularities in the surface thereof by a coiled spring $n$, interposed between a flange or collar $n'$ on a sleeve $n^2$ on the shaft N, and a nut $n^3$, screwed into an opening in the bed or frame A concentric with said shaft. Interposed between the sleeve $n^2$ and the spiral gear M is a thrust ball-bearing $n^4$. The shaft N being movable endwise, the spring applying pressure thereto through the spiral gear M keeps the friction-disk O constantly pressed against the friction-wheel P. The tension of the spring is adjustable by means of the nut $n^3$.

The tool-carriage C' is, as usual, slidably mounted on ways on the bed or frame A, and it is geared to the feed-shaft W in the following manner: Secured to the front side of the frame of the machine is a rack D', with which meshes a pinion E' on a shaft F', journaled in bearings on the carriage. A gear G' on the shaft F' meshes with a pinion H' on a shaft I', also journaled in bearings on the carriage, to which shaft I' is secured a worm-wheel K'. Adapted to mesh with the latter is a worm L', loosely mounted on a stud-shaft M', fixed in a swinging frame or rocker N', that is pivoted or hung concentric with the feed-shaft W on the carriage C', tubular extensions $n^5$ and $n^5$, through which passes the shaft, engaging the bearings. Integral with the worm L' is a gear O', which meshes with a gear P', splined to the feed-shaft W and movable along the same with the rocker as the carriage C' moves along. Pivoted to a bracket on the carriage C' is a lever Q', which at its lower end has a lug or stud $q$, adapted to engage a notch in a pin R', that projects horizontally from the rocker, and when it is engaged by the lever-stud the rocker is thereby held in the position in which the worm and worm-wheel are in engagement. At its upper end and projecting toward the frame of the machine is a pin or stud $q'$, in the path of which as the carriage moves along is a block S', which acts to rock the lever and free the stud $q$ from the rocker-pin R' and allow the rocker to swing downward by gravity, disengaging the worm and worm-wheel, and so stopping the feed of the carriage. The block S' is adjustable to different positions to enable the stopping of the carriage-feed to be effected at different points, and for this purpose it is mounted on or attached to a rod or bar T', slidably mounted in guides U' and U' on the front side of the bed or frame A. A set-screw V' in one of the rod-guides is provided to secure the rod in the position to which it may be adjusted. The rod or bar T' has such length and the location of the guide with the set-screw V' is such relative to the rear limit of travel of the carriage that the set-screw is not covered by the apron $c$, but is always easily accessible, so that the position of the block S' can at all times be readily changed. The lever-pin-engaging surface of the block S' is preferably inclined, and there are two such surfaces, so that the lever may be operated by the travel of the carriage in either direction. A handle W', attached to the rocker by being clamped to one of the tubular extensions $n^5$, is provided for swinging the worm upward to engage with the worm-wheel.

An arm or handle $q^2$ on the lever Q' enables the rocker to be released by hand when desired.

For moving the carriage by hand the shaft I' outside the apron $c$ has a hand-wheel or spider $i$.

Forward travel of the tool-carriage C' is positively stopped by the following-described mechanism: Extending parallel with the direction of travel of the tool-carriage are two threaded rods or screws X' and X', that at one end are swiveled in a bracket Y', secured to the bed or frame A at one end thereof, each of said screws having a squared or polygonal head for the application of a suitable tool for revolving it. For the accommodation of each screw a slot C' is provided in the under side of the carriage C' lengthwise thereof, into which the screw extends, and on each screw within and conforming to the shape of the slot is a nut Z', which by the turning of the screw can be shifted to different positions lengthwise of the carriage. Mounted on the carriage in the space between the two screws X' and X' is a transversely-sliding block or bar $A^2$, which when at one extreme of its movement is adapted to engage one of the nuts Z', while at a mid-position it will engage neither. For locking the block or bar in each of the three positions mentioned a spring-pressed dog or latch $B^2$ is provided for engagement with each of three notches $a^2$ and $a^2$ in the bar. The notches are preferably each V-shaped, so that the latch will yield under endwise pressure applied to the bar for moving it from one position to another. A knob or handle $a'$ is provided on the bar for moving it. With the stop mechanism described, the nuts Z' and Z' being adjusted to different positions, the carriage can be positively stopped in either of two positions. To change from one stopping position to the other and to prevent the action of the stop mechanism is most easily effected by the mere sliding of the bar $A^2$. The screws are directly in the line of the thrust. There is no undue protrusion or extension of screws or rods from the machine, and yet a long adjustment is possible, and the screws are housed or covered.

Rotatably mounted on a circular boss $c^2$ on the top of the carriage $C'$ is a circular table $C^2$, eccentrically on the top of which is placed a tool-turret $D^2$, of usual construction, having tool-receiving sockets $b^2$, and diametrically opposite said turret the table has on its side a way $c^3$ for a tool-carrying slide $E^2$, that serves in place of the usual lathe cross-slide, the tool-holder $F^2$ thereon being preferably a turret, also having tool-receiving sockets $f^2$. The tools to be carried by the turret $F^2$ are preferably turning-tools, while those to be carried by the turret $D^2$ are by preference tools for boring and facing. By the half-revolution of the table $C^2$ one turret or the other may be brought into position for its tool to operate on the work. For locking the table with either of the turrets in operating position there are two holes $c^4$ and $c^4$ in the under side thereof, with which a vertical locking bolt or pin $G^2$ is adapted to engage. At its lower end the pin $G^2$ is pivoted to one end of a lever $H^2$, whose other end is engaged by a spring-pressed bolt $I^2$, that tends to throw the pin $G^2$ into locking position. The lever $H^2$ is secured to a rock-shaft $K^2$, mounted in bearings on the carriage-apron, and for moving the rock-shaft to release the locking-pin from the table $C^2$ a crank-arm $L^2$ is placed on the rock-shaft, that extends through an opening in the apron to the outside thereof, where it is in position to be readily grasped. As the tool-carrying table $C^2$ is rotated by hand to place one turret or the other in position for use, it is preferable in order to have both hands free to do this to employ a latch $M^2$, that is pivoted to the inner side of the apron, so as to engage a stud or lug $l$ on the side of the crank-arm when the latter is raised to unlock the table $C^2$. The latch has a handle $m$, that projects beyond the apron, so that it may be readily moved to free the crank-arm for locking the table. At diametrically opposite points there are two blocks $N^2$ and $N^2$, seated each in a cavity in the table $C^2$, so as to bear against the boss $c^2$, and each having engaging it a screw $O^2$ in a threaded opening in the table $C^2$, by means of which it may be pressed or clamped against the boss.

Our object in mounting the turret eccentrically is to enable it to be placed as far as possible out of the way when it is desired to work with the cross-slide tools.

For traversing the cross-slide $E^2$ it is provided with a toothed rack $e$, meshing with which is a gear $P^2$. With the latter meshes a pinion $Q^2$, keyed to a vertical shaft $R^2$, journaled in bearings on the table $C^2$, on which shaft is a second pinion $S^2$, that through an idler-gear $T^2$ receives motion from a pinion $U^2$ on a vertical shaft $V^2$, concentric with the table $C^2$. On the lower end of the shaft $V^2$ is a bevel-gear $W^2$, meshing with which is a bevel-pinion $X^2$ on a shaft $Y^2$, extending longitudinally of the lathe and within the bed of frame $A$ thereof. Meshing with a bevel-gear $Z^2$ on the shaft $Y^2$ is a bevel-pinion $A^3$ on a shaft $B^3$, that extends to the front of the lathe and has keyed to it a hand-wheel or spider $C^3$, by which the shaft may be revolved by hand, and thus through the gearing described the slide $E^2$ moved. For moving said slide by power a worm-wheel $D^3$, meshing with a worm $E^3$ on the shaft $W$, is mounted loose on the shaft $B^3$ and is adapted to be clutched to and unclutched therefrom at will, a friction-clutch $F^3$ of ordinary construction being provided. A stop for the cross-slide is provided that comprises a plate $G^3$ on the cross-slide guide, having a lug $g$ and shiftable by a screw $H^3$, and a bolt $I^3$ on the cross-slide, adapted to engage said lug $g$. The screw is securely held in the desired position by a suitable clamp. The bolt $I^3$ is shiftable to and from a position to engage the lug.

As by the train of gearing described the cross-slide is always in gear with the shaft $Y^2$, through which power from the feed-shaft $W$ is taken to traverse the cross-slide, it follows that the cross-slide can be fed by power at whatever angle it may be placed relative to the work by the turning of the table $C^2$, a thing obviously of great advantage in turning some shapes.

It will be apparent that by simultaneously feeding the carriage $C'$ and the cross-slide $E^2$ the lathe can be used to turn tapers.

To enable the cutting of screws on the lathe, a screw $K^3$ is mounted in bearings at the back of the lathe, and suitable change-gears, not necessary to be illustrated, are employed. Slidingly mounted in a cavity or recess in the carriage $C'$ is a half or sectional nut $L^3$, adapted to be moved into and out of engagement with the screw, for this purpose a rod $M^3$ being provided that reaches across the lathe to the front side thereof, from the under side of an extension of which projects a stud or pin $m'$. Engaging the latter is a cam-slot $n^6$ in a bar $N^3$, that is longitudinally movable in a direction at right angles to the rod $M^3$, a hand-lever $O^3$, having a pin-and-slot connection with the bar and pivoted to the carriage $C'$, being provided for moving the bar.

The machine rests upon a hollow box-like frame $P^3$, which is divided transversely by a vertical partition $p$ into two compartments, one of which serves as a tool-cabinet and the other as an oil-tank, from which oil for the machine is pumped and into which it may flow for use again. For its return to the oil-tank an opening is provided in the top of the frame $P^3$ near the partition $p$, which is covered by a screen $p'$. Rising from the bottom of the frame $P^3$ is a wall or partition $p^2$, that divides the oil-tank into two compartments $p^3$ and $p^4$. The compartment $p^3$ receives the oil passing through the screen and forms a settling-chamber for impurities that may pass through the screen with the oil, the oil leaving the impurities behind, flowing over the top of the wall $p^2$ into the other compartment, from which it is taken by a rotary pump $Q^3$, having an inlet-pipe $q$, that leads to said compartment $p^4$, and an outlet-pipe $q'$, by which oil is delivered to the machine where needed. An opening $p^5$ is provided in the side of the frame $P^3$, through which sediment in the compartment $p^3$ may be removed. Adjacent the side of the opening covered by the screen $p'$ is a depending rib $p^6$ for intercepting and causing to drop any oil tending to flow along the under side of the top of the frame $P^3$, and for a like purpose a rib $p^7$ is provided adjacent the vertical side of the opening $p^5$ near the screened opening.

The pump $Q^3$ is supported on a bracket $a^3$ on the bed A, and it is driven by the shaft N, to which it is detachably coupled. When it is desired to stop the working of the pump, it may be disconnected from the shaft.

Having thus described our invention, what we claim as new is—

1. In a lathe, the combination of tool-carriages movable, respectively, longitudinally and transversely, a feed-shaft for each carriage, a driving-shaft, gearing between the latter and one of the feed-shafts, gearing connecting the two feed-shafts, and means for clutching and unclutching said last-named gearing, whereby said feed-shafts may be revolved simultaneously, or the revolution of one of them stopped.

2. In a lathe, the combination of a carriage, carriage-feeding mechanism, comprising parts adapted to be connected and disconnected, means for disconnecting the feeding mechanism comprising a movable part on the carriage, a block in the path of such part, a shiftable bar carrying said block, and means for securing the bar, situated beyond the limits of travel of the carriage, whereby said securing means is always accessible, substantially as and for the purpose described.

3. In a lathe, the combination of a carriage, carriage-feeding mechanism, comprising gearing whose members are adapted to be connected and disconnected, means for disconnecting the feeding mechanism comprising a pivoted, gear-carrying part, a block in the path of such part, a shiftable bar carrying said block, and means for securing the bar, situated beyond the limits of travel of the carriage, whereby said securing means is always accessible, substantially as and for the purpose described.

4. In a lathe, the combination of a carriage, carriage-feeding mechanism comprising gears adapted to be moved into and out of engagement, a pivoted frame carrying one of said gears, a device to hold said frame with the gears in engagement, said gears, frame and holding device being mounted on the carriage, a block in the path of the holding device, a shiftable bar carrying said block, and means for securing the bar, situated beyond the limits of travel of the carriage, whereby said securing means is always accessible, substantially as and for the purpose described.

5. In a lathe, the combination of a carriage, adjustable stops to arrest the travel of the carriage, and a part situated between said stops and shiftable to coact with either of them, said stops being shiftable to positions whereby they may be engaged by said part on either side of it.

6. In a lathe, the combination of a carriage, adjustable stops to arrest the travel of the carriage, a bar situated between the stops and adapted to engage either of them, and said stops being shiftable to positions whereby they may be engaged by said bar on either of its sides.

7. In a lathe, the combination of a carriage, a bed, screws mounted on the bed and extending into slots in the carriage, nuts on the screws, and a bar slidably mounted on the carriage between the screws and shiftable to engage either of said nuts.

8. In a lathe, the combination of a carriage, a bed, two stops on the bed, and a shiftable bar on the carriage adapted to be moved from a position to engage one stop to a position to engage the other stop.

9. In a lathe, the combination of a carriage, a bed, a pair of screws, mounted on the bed, a nut on each screw, and a bar on the carriage shiftable from a position to engage one nut to a position to engage the other nut, substantially as and for the purpose described.

10. In a lathe, the combination of a carriage, a bed, a pair of screws mounted on the bed, a nut on each screw, and a bar on the carriage shiftable from a position to engage one nut, to a position to engage the other nut, and to a position to engage neither, substantially as and for the purpose described.

11. In a lathe, the combination of a rotatable table, and a plurality of turrets mounted eccentrically thereon, whereby each turret in turn may be presented in position to have its tools operate on the work 12. In a lathe, the combination of a rotatable table, a tool-carrying slide on said table, and a turret mounted eccentrically on the table, substantially as and for the purpose described.

13. In a lathe, the combination of a rotatable table, a slide thereon, a turret on the slide, and a turret mounted eccentrically on the table, substantially as and for the purpose described.

In testimony that we claim the foregoing we have hereunto set our hands this 31st day of August, A. D. 1901.

JAMES C. POTTER.
JOHN JOHNSTON.

Witnesses:
JAMES L. JENKS,
FLORENCE E. BATES.